(Model.)

M. PENFIELD.
Knob Attachment.

No. 227,992.   Patented May 25, 1880.

WITNESSES
Charles H Cosbin
Wm H Wolf

Martin Penfield   INVENTOR

UNITED STATES PATENT OFFICE.

MARTIN PENFIELD, OF NEW BRITAIN, CONNECTICUT.

KNOB ATTACHMENT.

SPECIFICATION forming part of Letters Patent No. 227,992, dated May 25, 1880.

Application filed March 17, 1880. (Model.)

*To all whom it may concern:*

Be it known that I, MARTIN PENFIELD, a citizen of the United States, residing at New Britain, in the county of Hartford and State of Connecticut, have invented certain new and useful Improvements in Fastening Spindles to Door-Knobs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in spindling door-knobs, the object of which is to provide a simple, cheap, and effective device, by means of which a spindle may be attached to the shank of a door-knob in such a manner that the knob can be adjusted on the spindle at any desired point, thereby adapting it to doors of varying thicknesses. This object I attain by the device shown in the accompanying drawings, in which—

Figure 1:
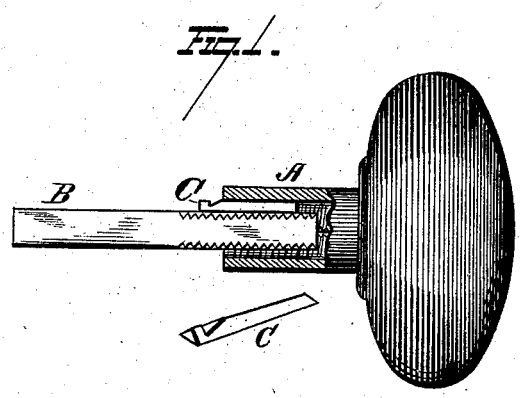
Figure 2:
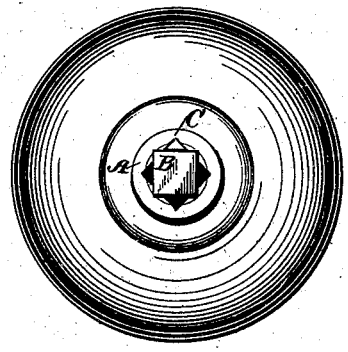

Figure 1 represents a side view of a door-knob, shank, and spindle, a portion of the shank being broken away, showing my improved fastening device; and Fig. 2, a plan view, looking down on the end of the spindle and shank, showing the spindle with an eighth-turn and the fastening-wedge inserted in one of the corners of the recess in the shank.

The letter A indicates a knob-shank provided with a screw-threaded recess for the reception of a spindle, B, one end of which is also screw-threaded. The spindle B is fitted into the recess and given one-eighth turn. A triangular-shaped wedge, C, is then inserted into either corner of said recess, causing the threads on the spindle and in the recess to act as biting-surfaces, thus securely attaching the knob to the spindle.

Having thus described my invention, what I claim, and desire to secure by Letters Patent, is—

In combination with a knob-shank having a screw-threaded recess, a screw-threaded spindle and a triangular-shaped wedge adapted to secure the spindle to the knob-shank by inserting said wedge into either one of the corners of the recess in the shank after the spindle is partially turned, substantially as and for the purposes specified.

MARTIN PENFIELD.

Witnesses:
CHARLES PECK,
WM. W. WOLFE.